United States Patent
Kim et al.

(10) Patent No.: US 7,113,186 B2
(45) Date of Patent: Sep. 26, 2006

(54) 3 DIMENSIONAL SLAB RENDERING SYSTEM METHOD AND COMPUTER-READABLE MEDIUM

(75) Inventors: Bo-Hyoung Kim, Seoul (KR); Yeong-Gil Shin, Seoul (KR); Jin-Wook Chung, Seoul (KR)

(73) Assignee: Infinitt Co., Ltd., Seoul (KR)

( * ) Notice: Subject to any disclaimer, the term of this patent is extended or adjusted under 35 U.S.C. 154(b) by 60 days.

(21) Appl. No.: 10/432,731

(22) PCT Filed: Nov. 22, 2001

(86) PCT No.: PCT/KR01/02020

§ 371 (c)(1),
(2), (4) Date: Oct. 27, 2003

(87) PCT Pub. No.: WO02/43008

PCT Pub. Date: May 30, 2002

(65) Prior Publication Data

US 2004/0109032 A1    Jun. 10, 2004

(30) Foreign Application Priority Data

Nov. 25, 2000  (KR) ............................ 2000-0070723
Jun. 27, 2001  (KR) ............................ 2001-0037137

(51) Int. Cl.
   *G06T 15/00*   (2006.01)
(52) U.S. Cl. ........................ 345/420; 382/131; 715/738
(58) Field of Classification Search ........ 345/419–422; 382/131–132; 715/738; 600/443
   See application file for complete search history.

(56) References Cited

U.S. PATENT DOCUMENTS

| 5,113,357 | A | 5/1992 | Johnson et al. |
| 5,986,662 | A | 11/1999 | Argiro et al. |
| 6,443,894 | B1 * | 9/2002 | Sumanaweera et al. ...... 600/443 |
| 6,734,880 | B1 * | 5/2004 | Chang et al. ................ 715/738 |
| 6,826,297 | B1 * | 11/2004 | Saito et al. .................. 382/131 |
| 6,925,200 | B1 * | 8/2005 | Wood et al. ................. 382/132 |

* cited by examiner

*Primary Examiner*—Phu K. Nguyen
(74) *Attorney, Agent, or Firm*—Global IP Counselors, LLP

(57) ABSTRACT

A reference image is displayed by processing spatial distribution to image data recording. A screen for inputting a corresponding command is displayed when requested. A corresponding slab is a three-dimensional slab rendered according to an input of a slab control command on a displayed screen. The three-dimensional rendered slab is also displayed. When the slab control command is designated among the Sagittal image, the Coronal image, and the Axial image on the displayed screen, the image designated on the basis of the reference image is displayed. When the slab control command is designated as a request to Rotate on the displayed screen, it is checked whether a new rotation center is designated. When the new rotation center is designated, volume or interest (VOI) planes are rotated on the basis of the new rotation center and the image is generated and displayed.

8 Claims, 7 Drawing Sheets

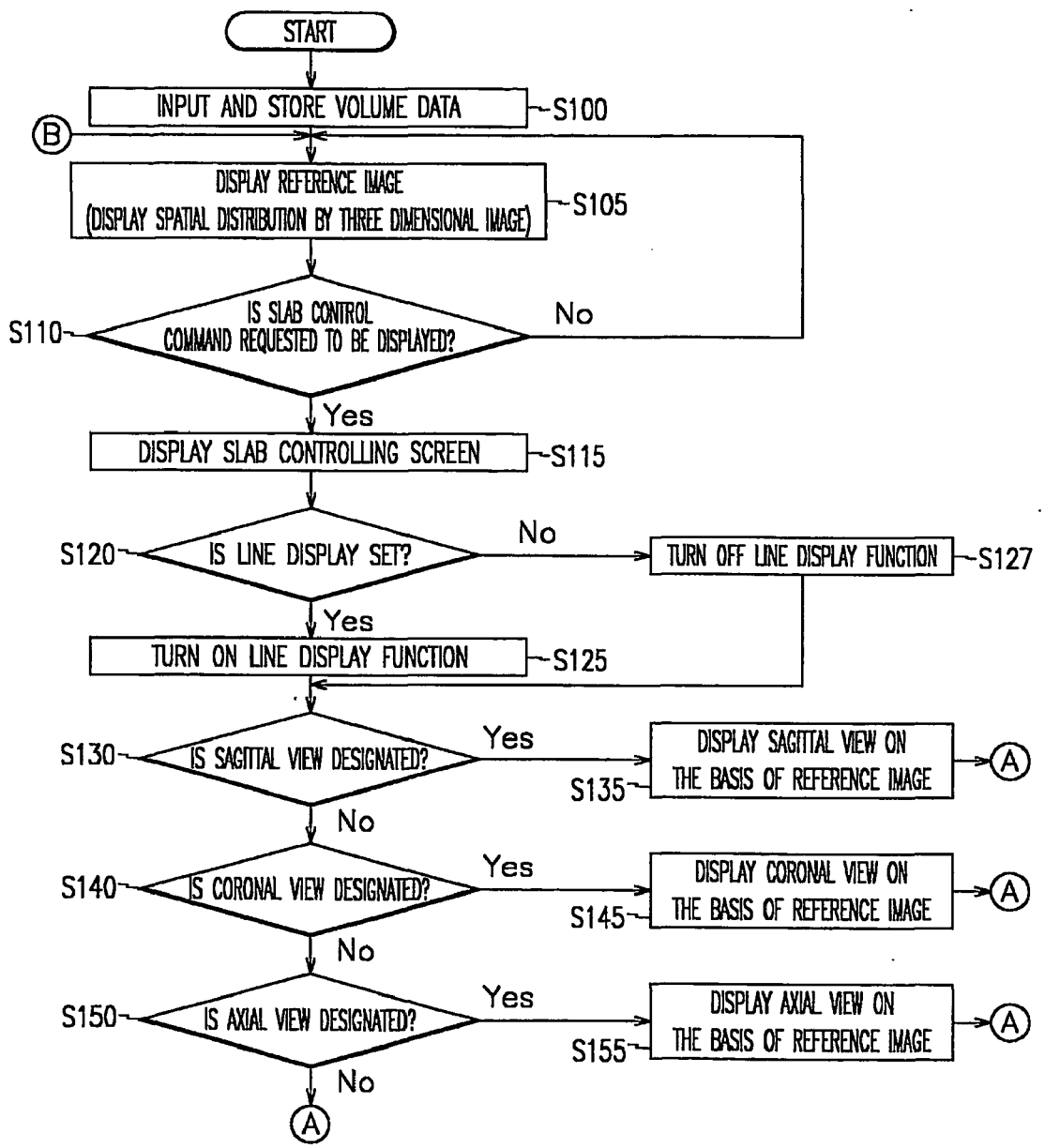
F I G. 2a

3 DIMENSIONAL SLAB RENDERING SYSTEM METHOD AND COMPUTER-READABLE MEDIUM

TECHNICAL FIELD

The present invention relates to a rendering system and method, and a computer readable recording medium for storing the method. More specifically, the present invention relates to a three-dimensional slab rendering system and method for specifying a volume of interest (VOI) of a three-dimensional data from a reference image, extracting and visualizing the volume data corresponding to the VOI, and processing the visualized image, to thus provide detailed information on the VOI, and to a computer readable recording medium for storing the method.

BACKGROUND OF THE INVENTION

In general, a three-dimensional image processing system has various areas of application. In particular, the three-dimensional image processing system is frequently used for designing and constructing three-dimensional structures such as automobiles and ships, and visualizing three-dimensional volume data in medical imaging applications. In medical imaging applications, the volume data comes in a series of two-dimensional images obtained from computed tomography (CT) or magnetic resonance imaging (MRI).

With the use of only two-dimensional images, it is difficult to obtain an entire three-dimensional effect, and it is impossible to observe an arbitrary section. On the other hand, with three-dimensional medical imaging technology it is possible to search the correct position of an affected area and establish proper surgical plans.

When a user tries to look at an arbitrary internal organ in a three-dimensional medical image, it is difficult to look at the desired organ because other organs obscure it. At this time, if a volume of interest (VOI) is specified in three-dimension and a corresponding volume region is rendered, it is not necessary to perform segmentation in two-dimensional images before three-dimensional rendering as in conventional technologies.

Therefore, in medical applications, the VOI is very helpful in diagnoses and relieves doctors and radiologists from performing manual tasks. Slab rendering is the rendering of an arbitrary partial region in the three-dimensional volume data in order to support the VOI.

A conventional VOI rendering system has a problem in that an interface for—expressing an interested region is too complicated to be used by non-trained users such that the planes for the VOI are specified respectively and grouped in order to designate a slab.

Also, the conventional system rotates a reference image while moving a mouse on a plane. In this case, only the rotations on the basis of two coordinate axes are available.

For example, when the mouse is horizontally moved, the reference image is rotated using a vertical axis on a screen as a rotation axis. When the mouse is vertically moved, the reference image is rotated using a horizontal axis on the screen as the rotation axis. Therefore, it is difficult to intuitively view and manipulate the displayed slab. Also, it has limitation in displaying the interested region because it designates the slab to be parallel to the respective axes.

SUMMARY OF THE INVENTION

It is an object of the present invention to provide a three-dimensional slab rendering system, which is able to rotate a slab without restricting the slab to be parallel to the respective axes, to thus efficiently specify a region of interest at various angles and to thus easily display and control the region.

It is another object of the present invention to provide a three-dimensional slab rendering method, which is capable of efficiently and easily displaying and controlling a region of interest in the three-dimensional volume data.

It is another object of the present invention to provide a computer readable recording medium for storing the three-dimensional slab rendering method.

In one aspect of the present invention, there is provided a three-dimensional slab rendering system, comprising an input storage unit receiving a three-dimensional volume data representing characteristics of respective parts of a human body in a three-dimensional spatial function, and storing the volume data for further processing; a slab control processor for generating reference images by processing the volume data stored in the input storage unit, designating a predetermined volume of interest (VOI) in a reference image in the form of an arbitrary slab, and rendering the volume region corresponding to the designated slab; a display for displaying reference images and the slab rendered image; and an input unit for user requests for designating the VOI in the reference images.

In another aspect of the present invention, there is provided a slab rendering method for receiving and storing volume data, and displaying a rendered image on the basis of the designated volume data, comprising (a) generating reference images by processing the volume data according to user manipulations, (b) displaying a screen for command inputs when a user requests to display an image for inputting a slab control command, and (c) rendering a corresponding slab according to a user input of a slab control command r on a screen displayed in the step (b).

The step (c) comprises (c-1) displaying a corresponding reference image when the slab control command is one of Sagittal, Coronal, and Axial on the screen displayed in the step (b); (c-2) checking whether a new rotation center is specified when the slab control command is Rotate on the screen displayed in the step (b); (c-3) rotating the volume data in the step (c-1) on the basis of the new rotation center when the new rotation center is specified in the step (c-2), to thus generate a rendered image; and (c-4) rotating the volume data in the step (c-1) on the basis of the previously set rotation center when the new rotation center is not specified in the step (c-2), to thus generate a rendered image.

The step (c) further comprises (c-5) moving the slab in a direction parallel to the slab plane in the step (c-1) according to user manipulations when the slab control command is Move on the screen in the step (b).

The step (c) further comprises (c-6) controlling the thickness of the slab in the image in the step (c-1) according to user manipulations when the slab control command is Thickness on the screen in the step (b).

In another aspect of the present invention, there is provided a computer readable recording medium storing a three-dimensional slab rendering method for receiving and storing volume data, and rendering the stored volume data, comprising (a) generating reference images by processing the volume data according to user manipulations, (b) displaying a screen for command inputs when a user requests to display an image for inputting a slab control command, and (c) rendering the slab according to an input of a slab control command caused by user manipulation on the screen displayed in the step (b).

With the three-dimensional slab rendering system and method, and the computer readable recording medium for storing the method, a user can easily search an interested region while changing a display angle on a three-dimensional reference image. In addition, one more volume-rotating axis is provided using the wheel of a mouse.

BRIEF DESCRIPTION OF THE DRAWINGS

The accompanying drawings incorporated in and constituting a part of the specification, illustrate an embodiment of the invention, and, together with the description, serve to explain the principles of the invention.

FIGS. 2A and 2B are flowcharts for explaining a three-dimensional slab rendering method according to an embodiment of the present invention;

DETAILED DESCRIPTION

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
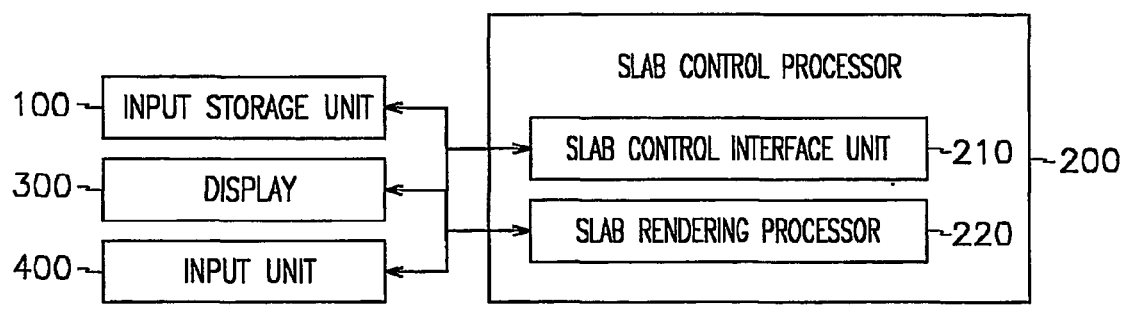
FIG. 1 shows a structure of a preferred embodiment of a three-dimensional image processing system according to the present invention.

FIG. 1 shows a structure of a preferred embodiment of a three-dimensional image processing system according to the present invention.

Referring to FIG. 1, the three-dimensional image processing system according to the present invention includes an input storage unit 100, a slab control processor 200, a display 300, and an input unit 400.

The input storage unit 100 receives the characteristics according to the positions of the respective parts of a three-dimensional structure having a predetermined characteristic expressed by a three-dimensional position function in the form of volume data, and stores the volume data for processing hereinafter. For example, in the case of receiving and storing the volume data as a set of a result of computed tomography (CT) or magnetic resonance imaging (MRI) section scanning, the input storage unit can be realized through access hardware for receiving data from the respective measurement apparatuses, and a hard disk or a memory device for storing the data. In the case of storing the measured result in another storage medium and reading the measured result or storing the measured result in the storage medium such as a hard disk, the input storage unit 100 can be realized through access hardware for reading data from storage apparatuses inside/outside the three-dimensional image processing system, and a hard disk or a memory device for storing the data.

The slab control processor 200 includes a slab control interface unit 210 and a slab rendering processor 220. The slab control processor 200 processes spatial distribution having the above characteristic for conversion into video data on the basis of the data stored in the input storage unit 100, displays the video data, designates a predetermined volume of interest (VOI) displayed on a reference image in the form of an arbitrary slab using the video data as the reference image, extracts and processes a three-dimensional image in the designated slab from the volume data, and displays a slab rendering image.

The display 300 displays the reference image and the slab-rendering image.

The input unit 400 lets a user designate the predetermined VOI from the reference image.

A three-dimensional slab, rendering system including the slab control processor or the slab processor can be realized by a computer that can perform a series of calculation processes, a set of computers in which data can be exchanged between the computers, and an application-specific integrated circuit (ASIC).

As mentioned above, according to a user interface method using the slab rendering system of the present invention, a user can more easily search the VOI while changing a display angle on a screen of a three-dimensional image used as a reference image, that is, while rotating the three-dimensional image on the screen.

Figure 2B:
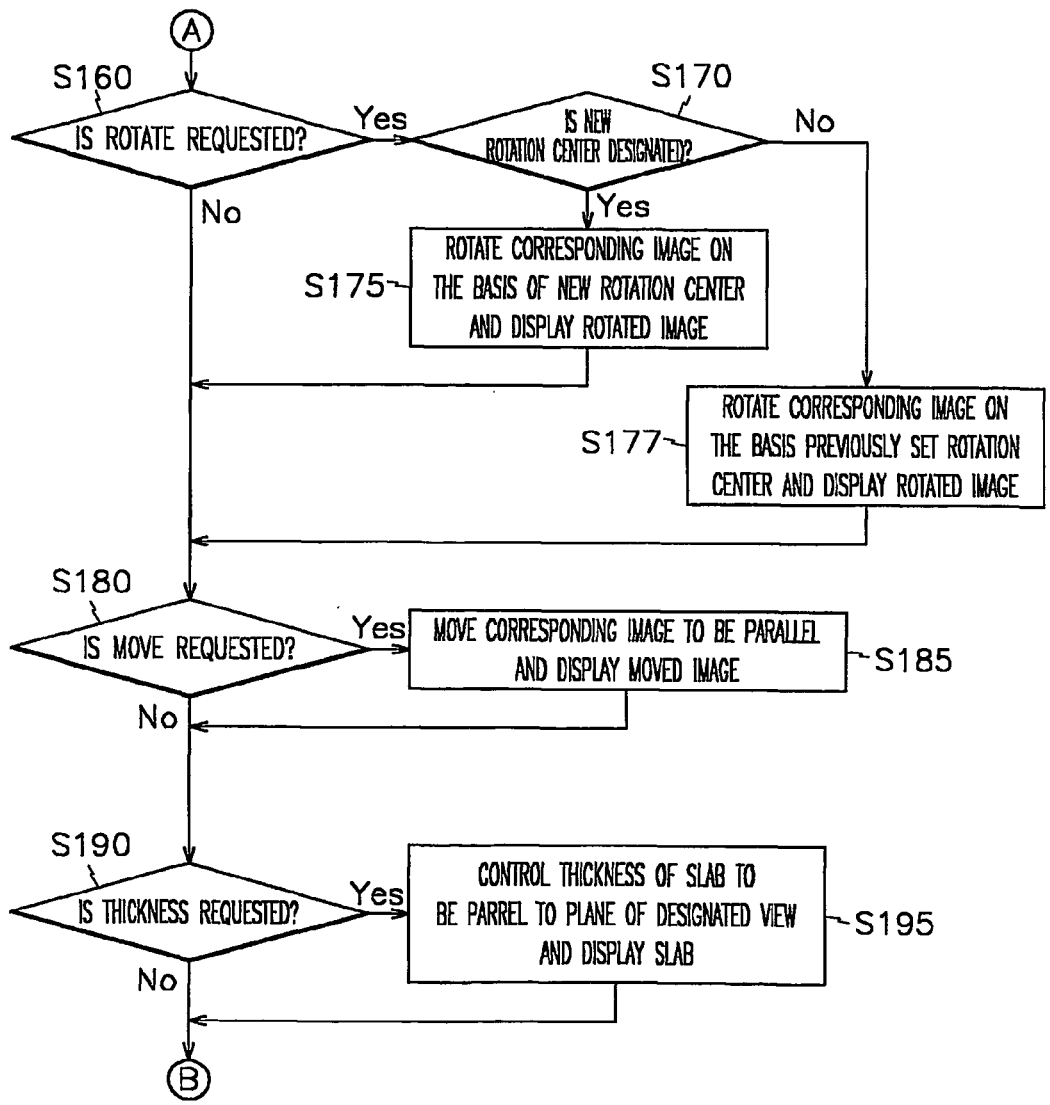

FIGS. 2A and 2B are flowcharts for explaining a three-dimensional slab rendering method according to an embodiment of the present invention.

Referring to FIGS. 2A and 2B, volume data is received and stored (S100).

Spatial distribution is processed for conversion into the three-dimensional image and the reference image, and preferably, the three-dimensional image is displayed (S-105). That is, the three-dimensional image with respect to a slab arbitrarily designated by the three-dimensional slab rendering system is displayed from the volume data, preferably a plurality of spatially distributed volume slices. At this time, the arbitrarily designated slab can be set as a default value by a programmer of the three-dimensional slab rendering system or a user of the corresponding system, or can be set on the basis of the previously moved slab during the initial movement of the three-dimensional slab rendering system.

It is checked whether it is requested to display a predetermined screen for inputting a slab control command (S110). When it is determined in S100 that it is not requested to display the predetermined screen for inputting the slab control command, the process returns to S105. When it is determined in S110 that it is requested to display the predetermined screen for inputting the slab control command, a slab-controlling screen is displayed (S115). At this time, the provided slab-controlling screen is preferably displayed on a displayed reference image and preferably includes the control options of Sagittal, Coronal, Axial, Rotate, Move, Thickness, Line, and Reset.

On the slab-controlling screen, the user can obtain an image with respect to a desired slab from the reference image by simply clicking a corresponding icon or selecting a corresponding button.

It is checked whether a line display function for displaying a slab is set on the display of the corresponding slab controlling screen (S120). When it is determined in S120 that the line display function is requested, the corresponding line display function is turned on (S125). When it is determined in S120 that the line display function is not requested, the corresponding line display function is turned off (S127). When the line display function is turned on in S125, a line will be displayed on the slab using the reference image.

Following S125 or S127, it is checked whether a Sagittal view is designated (S130), When the Sagittal view is designated, the Sagittal view is displayed on the basis of the reference image (S135).

When it is determined in S130 that the Sagittal view is not designated, it is checked whether a Coronal view is designated (S140). When the Coronal view is designated, the Coronal view is displayed on the basis of the reference image (S145).

When it is determined in S150 that the Coronal view is not designated, it is checked whether an Axial view is designated (S150). When the Axial view is designated, the Axial view is displayed on the basis of the reference image (S155).

When it is determined in S150 that the Axial view is not designated, it is checked whether the Rotate is requested following S135, S145, or S155 (S160). When it is determined that the Rotate is requested, it is checked whether a new rotation center is designated (S170).

When it is determined in S170 that the new rotation center is designated, an image is rotated on the basis of the new rotation center and the rotated image is displayed (S175). At this time, if a point designated by a user through a mouse penetrates a rendering image, the new rotation center is set as the center of the penetrated rendering image.

How the new rotation center designated by the user is sensed and how an image is rotated on the basis of the sensed rotation center will now be briefly described.

It is possible to sense the x, y coordinate value by designating a point on an image displayed on a two dimensional plane. A point on a plane will be a straight line in a three-dimensional image while having the corresponding x, y coordinates in common.

When the corresponding straight line initially meets the voxel corresponding to the wall of a structure, the meeting position is recorded in inVolumePoint. When the corresponding straight line meets the voxel corresponding to the wall of the structure for the second time, the meeting position is recorded in outVolumePoint. At this time, it is possible to check the density value of the wall of the structure by checking the values of the respective unit parts that form the volume data and peripheral values. Therefore, it is possible to check whether the corresponding straight line meets the wall. It is possible to obtain an intermediate point value because the inVolumePoint and the outVolumePoint are uniform coordinate values in a three-dimensional space. A point input from the volume-rendering image can be converted in the center of the structure on the basis of the intermediate point value.

When it is determined in S170 that the new rotation center is not designated, the image is rotated on the basis of the previously set rotation center, preferably the rotation center previously set as the center of the entire volume, and the rotated image is displayed (S177). At this time, because the displayed image has three-dimensional spatial values, the previously set rotation center can be programmed so as to simply operate the intermediate point on the basis of the values. It is possible for the user to set the rotation center value as desired.

That is, the user can rotate the slab on one view among the previously designated views, that is, the Sagittal view, the Coronal view, and the Axial view, according to a mouse drag or a keyboard through S160 through S177. Although the center of the slab rotation is basically set at the center of the entire volume, the user can change the center of the slab rotation by clicking a specific button of a mouse, for example, a right button in an arbitrary position of the slab, to thus designate a new rotation center on the three-dimensional image according to the slab rendering. Therefore, it is possible to easily set the rotation center in the VOI and to look at the image of an arbitrary slab in any direction.

When it is determined in S160 that the Rotate is not requested, it is checked whether Move is requested following S175 or S177 (S180).

When it is determined in S180 that the Move is requested, the corresponding image is moved to be parallel to a plane and the moved image is displayed (S185).

When it is determined in S180 that the Move is not requested, it is checked whether it is requested to control Thickness following S185 (S190). When it is requested to control the Thickness, the thickness of a slab is controlled to be parallel to the plane of the designated view, the image whose thickness is controlled is displayed, and the process returns to S105 (S195). When it is not requested to control the Thickness, the process returns to S105.

That is, the user can control the thickness of the slab to be parallel to the plane of one among the previously designated views, that is, the Sagittal view, the Coronal view, and the Axial view by manipulating the mouse drag or the keyboard through S190 through S195. At this time, the thickness of the slab can be controlled to a pixel unit.

Though not shown in the above-mentioned flowcharts, when the user sets an initialization function on the display of the slab-controlling screen, it is possible to perform the slab rendering by the initially designated value. The initial value can be the initial set value of the three-dimensional slab rendering program described in the present invention, the set value before the user turns off the three-dimensional slab rendering program after executing the three-dimensional slab rendering program, or the initial value set as desired by the user.

Processes of on/off setting the display of the line for slab control processing an image, designating one among the Sagittal view, the Coronal view, and the Axial view, and rotating and moving the slab and controlling the thickness of the slab on the designated view are described as performed in this order. However, it should be apparent to anyone skilled in the art that the above order can be changed.

For example, it is possible to perform the step of on/off setting the display of the line after the step of designating the view, after the step of rotating and moving the slab and controlling the thickness of the slab, before the step of displaying the slab following the formation of the three-dimensional slab, or after the step of initially displaying the slab.

As mentioned above, the slab control processing according to the present invention includes the step of providing an interface for controlling the slab, the step of the user performing rendering processing with respect to the function designated by the slab control interface, and the step of displaying the rendered image on the screen. Therefore, the user can variously render the image of a desired human body structure and can observe the rendered image.

The three-dimensional slab rendering system and method shown in FIGS. 1, 2A, and 2B will now be described in more detail.

When a matrix for converting a plane equation for defining the slab into an object coordinate system is $M_{VOI}$, $M_{VOI}$ is obtained by multiplying two matrices $M_{rotate}$ and $M_{translate}$ by each other. $M_{rotate}$ refers to the rotation of a plate from side to side or up and down. $M_{translate}$ refers to the movement of a plane to a normal vector direction.

When a matrix for converting an object coordinate system into an image coordinate system is $M_{view}$, the plane equation is converted into an equation on the image coordinate system by Equation 1.

$$\begin{bmatrix} x' \\ y' \\ z' \\ 1 \end{bmatrix} = M_{view} \times M_{VOI} \begin{bmatrix} x \\ y \\ z \\ 1 \end{bmatrix} = M_{view} \times M_{translate} \times M_{rotate} \begin{bmatrix} x \\ y \\ z \\ 1 \end{bmatrix}$$

The calculation of the plane equation in the object coordinate system will now be described with reference to Equation 1.

The calculation of the plane equation in the object coordinate when the slab is designated to the Sagittal view according to the manipulation of the user as described in S130 of FIG. 2A will now be described.

Two planes for designating the slab are $$z = \frac{slab_{thick}}{2}$$

and $$z = \frac{-slab_{thick}}{2}, slab_{thick}$$

is a distance between the two planes for designating the slab.

$M_{rotate}$ is initialized to an identity matrix. $M_{translate}$ is initialized to Translate (volX/2, volY/2, and volZ/2).

The matrix $M_{VOI}$ for converting a slab designation plane into the object coordinate is calculated as described in Equation 2.

$MOVI_{translaterotate}$ [Equation 2]

The equation of a plane that converts two planes for designating a slab $$\left( z = \frac{slab_{thick}}{2}, z = \frac{-slab_{thick}}{2} \right)$$

into the object coordinate system by $M_{VOI}$ is calculated as outlined in Equations 3 and 4.

$$z = \frac{slab_{thick}}{2} \circ \square \text{ by } M_{VOI} \circ \square \text{ } px + qy + rz + s_1 = 0 \quad \text{[Equation 3]}$$

$$z = \frac{-slab_{thick}}{2} \circ \square \text{ by } M_{VOI} \circ \square \text{ } px + qy + rz + s_2 = 0 \quad \text{[Equation 4]}$$

When the inverse matrix of $M_{VOI}$ is $$M_{VOI}^{-1} = \begin{bmatrix} a & b & c & tx \\ d & e & f & ty \\ g & h & i & tz \\ 0 & 0 & 0 & 1 \end{bmatrix}, p = g,$$

$s1 = tz - (slab_{thick})/2$, and $s2 = tz + (slab_{thick})/2$.

A case where the slab is rotated by the manipulation of the user will now be described.

The user determines the rotation amount of the slab plane through an input by a mouse. For example, when the mouse is dragged from side to side, the slab plane is rotated centering on the y axis on the image coordinate system. When the mouse is dragged up and down, the slab plane is rotated centering on the x axis on the image coordinate system.

When the slab plane is rotated centering on the x axis on the image coordinate by dragging the mouse up and down, a vector $\bar{e}_{x\ object} = (l, m, n)$ that converts a vector $\bar{e}_x = (1, 0, 0)$ corresponding to the x axis on the image coordinate system into the object coordinate system using the inverse matrix of $M_{view}$ is calculated.

A matrix $M_r$ for rotating $\bar{e}_{x\ object}$ by is calculated as described in Equation 5.

$$M_r = \begin{bmatrix} 1 - 2y^2 - 2z^2 & 2xy - 2wz & 2xz + 2wy & 0 \\ 2xy + 2wz & 1 - 2x^2 - 2z^2 & 2yz - 2wx & 0 \\ 2xz - 2wy & 2yz + 2wx & 1 - 2x^2 - 2y^2 & 0 \\ 0 & 0 & 0 & 1 \end{bmatrix} \quad \text{[Equation 5]}$$

where $$w = \cos\frac{\theta}{2}, x = l \times \sin\frac{\theta}{2}, y = m \times \sin\frac{\theta}{2}, \text{ and } z = n \times \sin\frac{\theta}{2}.$$

Therefore, $M_{rotate}$ is newly calculated by $M_{rotate} = M_r \times M_{rotate}$ on the basis of which the slab is rotated.

As mentioned above, the user can rotate the slab by pressing a rotation button using the mouse drag or the keyboard. At this time, the center of rotation of the slab is basically set as the center of the entire volume. However, the user can designate a new rotation center on the three-dimensional image caused by the slab rendering and can change the center or the rotation by clicking the right button of the mouse in an arbitrary position of the slab. Therefore, it is possible to easily set the rotation center in the VOI and to look at the image of an arbitrary slab in any direction.

As described in S180, a case where the slab is moved according to the manipulation of the user will now be described.

That is, a normal vector $\bar{N} = (p, q, r)$ of a plane on the object coordinate system is calculated according to Equations 3 and 4. It is assumed that the normal vector of the plane converted into the image coordinate system by the matrix $M_{view}$ for converting the object coordinate system into the image coordinate system is $\bar{N}_{im} = (p0q0r0)$.

When the desired amount of movement of the slab plane designated by the user using the mouse is referred to as a vector $\bar{D}$, the vector is defined in the image coordinate system.

When $\bar{D}_{object}$ is obtained by converting the vector $\bar{D}$ into the object coordinate system, the amount $\nabla_{move}$ of actual movement of the plane to the direction of the normal vector is calculated using Equation 6.

$$\bar{V}_{move} = |\bar{D}_{object}| \times \bar{N} = (i, j, k, l) \quad \text{[Equation 6]}$$

where $M_{translate}$ is newly calculated by $$M_{translate} = \begin{bmatrix} 1 & 0 & 0 & 0 \\ 0 & 1 & 0 & 0 \\ 0 & 0 & 1 & 0 \\ i & j & k & 1 \end{bmatrix} \times M_{translate},$$

on the basis of which the slab is moved.

As mentioned above, the user can move the slab to be parallel to the plane of the previously designated View by pressing the Move button using the mouse drag or the keyboard.

As described in S190 and S195, $slab_{thick}$ is increased when the distance of the slab becomes wider and $slab_{thick}$ is reduced when the distance of the slab becomes narrower.

That is, the user can control the thickness of the slab to be parallel to the plane of the currently set View by pressing the Thickness button using the mouse drag or the keyboard. At this time, it is possible to reform a multi-surface image by reducing the thickness of the slab to a pixel.

The results of the above-mentioned various processes will now be described with reference to the attached drawings.

Figure 3:
FIG. 3 shows a result of rendering the slab specified by a predetermined initial value from a reference image, in order to control the slab.

FIG. 3 shows a result of undergoing a slab rendering process after setting a slab according to a predetermined initial value from a reference image, in order to control the slab.

FIG. 3 shows a result of arbitrarily rotating the reference image by the screen display angle change method in the Sagittal view and designating and rendering the slab.

Figure 4:
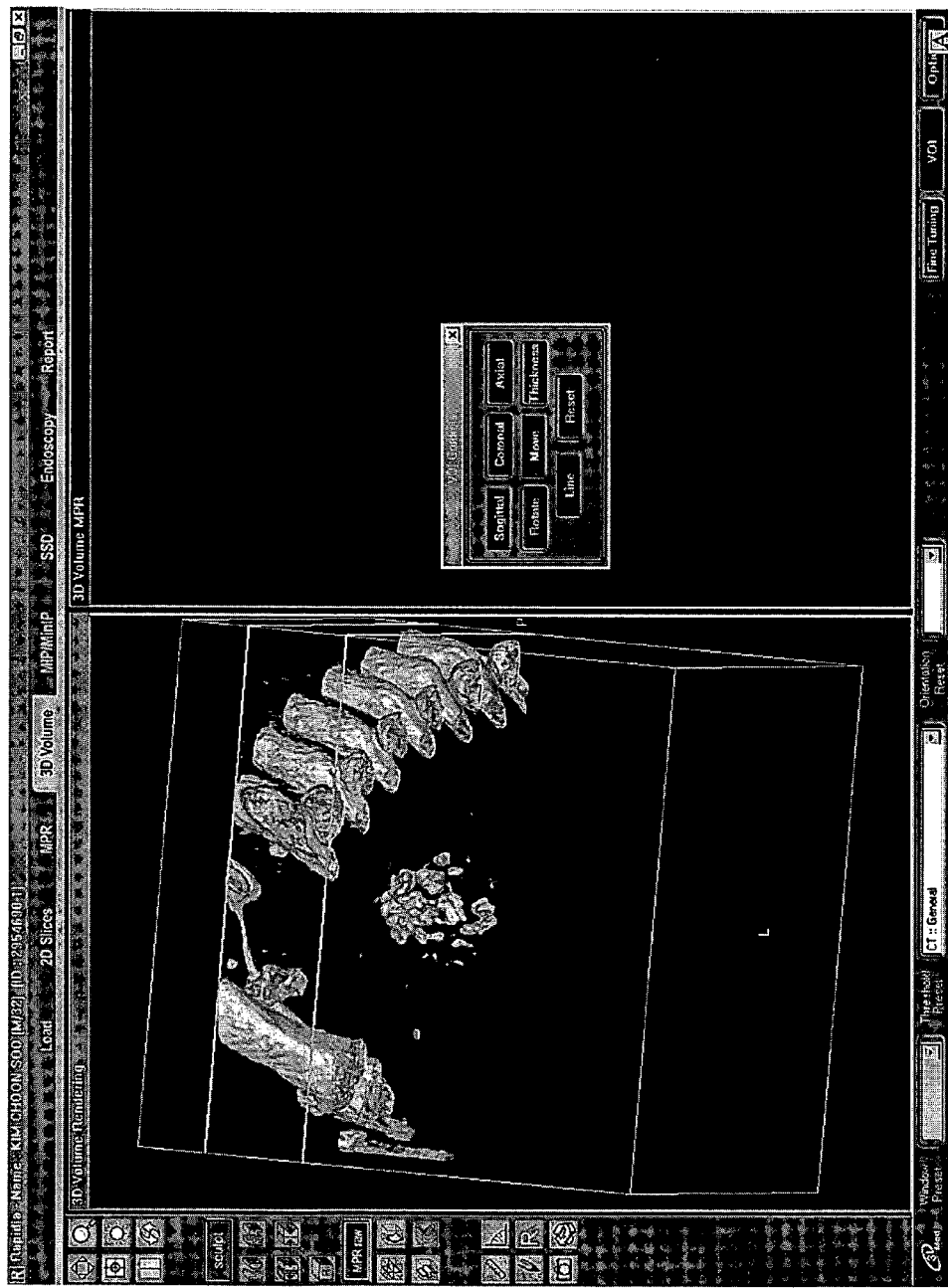
FIG. 4 shows a screen obtained by moving a slab from the initial position of FIG. 3 at the request of movement.

FIG. 4 shows a screen obtained by moving a slab from the initial position of FIG. 3 at the request of movement.

Referring to FIG. 4, the slab is moved to be parallel to the plane of the Sagittal view. That is, when the user drags the mouse backward on the slab, the slab moves backward to be parallel to the plane of the Sagittal view. When the user drags the mouse forward on the slab, the slab moves forward to be parallel to the plane of the Sagittal view.

Figure 5:
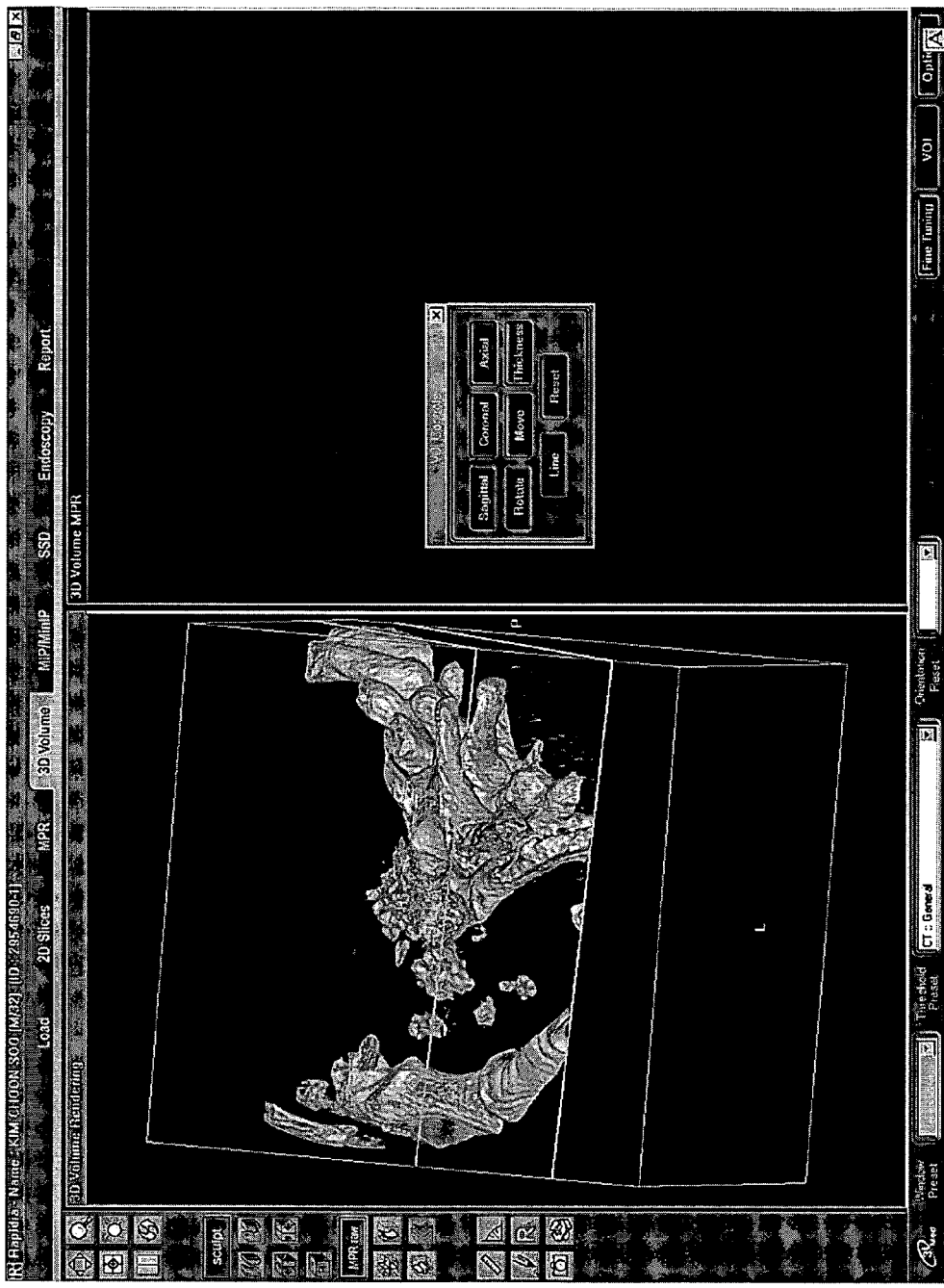
FIG. 5 shows a screen displaying a result of rotating the slab of FIG. 4 from the position of FIG. 4.

FIG. 5 shows a screen displaying a result of rotating the slab of FIG. 4 from the position of FIG. 4.

Referring to FIG. 5, when the user horizontally moves the mouse, the slab rotates in the Y axial direction. When the user vertically moves the mouse, the slab rotates in the X axial direction.

Figure 6:
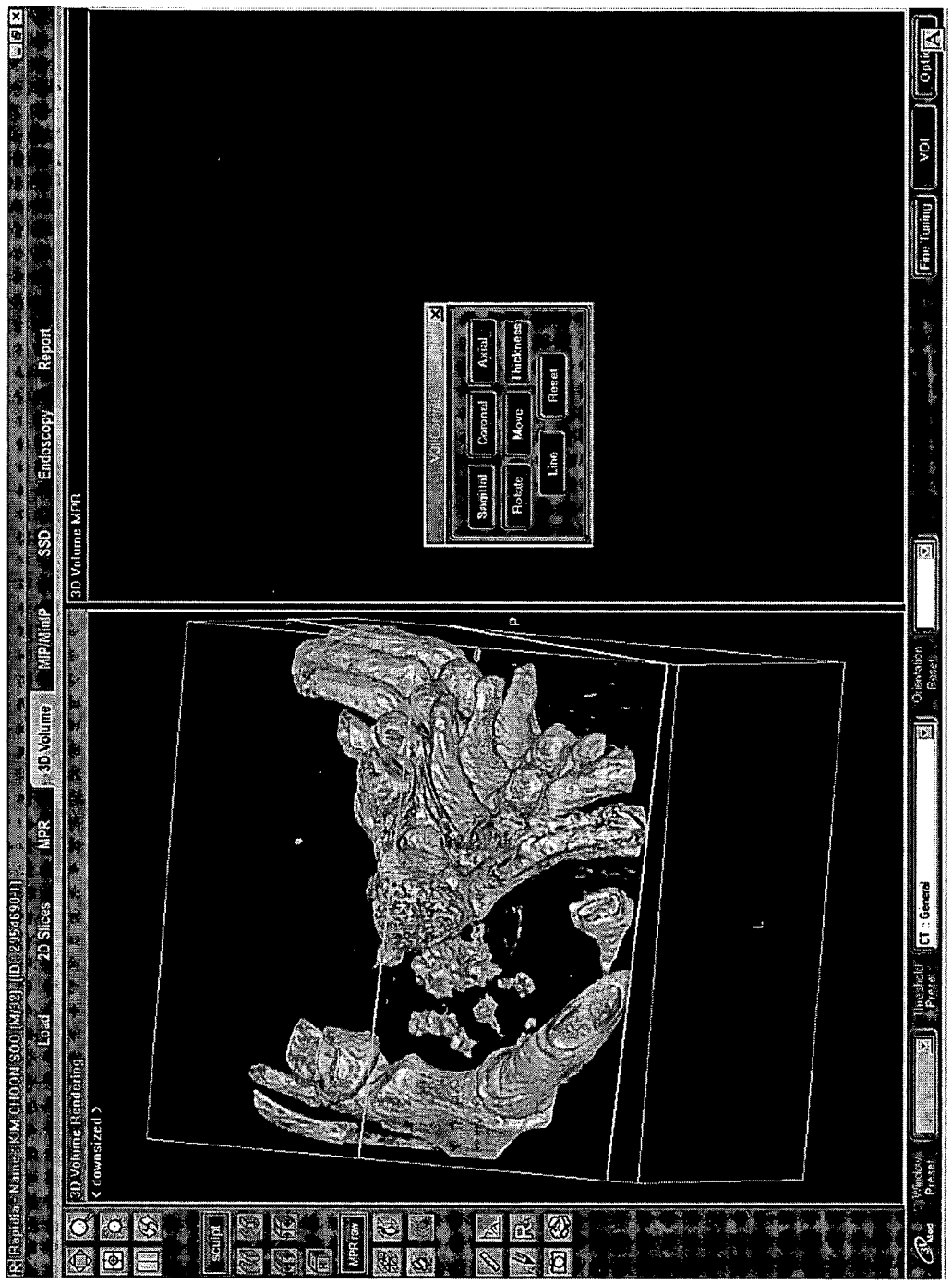
FIG. 6 shows a screen displaying a result of controlling the thickness of the slab of FIG. 5.

FIG. 6 shows a screen displaying a result of controlling the thickness of the slab of FIG. 5.

Referring to FIG. 6, as a result of increasing the thickness of the slab, the thickness of the slab is controlled to be parallel to the plane of the Sagittal view.

INDUSTRIAL APPLICABILITY

Various changes in form and details may be made in the three-dimensional slab rendering system and method and the computer readable recording medium for storing the method according to the present invention within the spirit and scope of the invention without being limited to the preferred embodiments.

For example, a light pen, the keyboard, and various input apparatuses as well as the mouse can be used as the input means. The three-dimensional slab rendering system and method and the computer readable recording medium for storing the method according to the present invention can be used in a wide variety of applications in the designing and constructing of three-dimensional structures such as automobiles, ships, and buildings, as well as in systems for processing medical images.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As mentioned above, the slab rendering processing according to the present invention provides a more intuitive interface than the slab rendering processing method supported by the conventional system. Accordingly, it is possible to more easily view specific areas in a three-dimensional format. Therefore, the slab rendering processing according to the present invention can be efficiently applied to applications such as medical diagnoses.

That is, the slab is not only expressed to be parallel to the respective axes, but the three-dimensional image of the entire volume including the slab is freely rotated in a state where the slab is designated. Accordingly, it is possible to easily sense the position of the slab in the three-dimensional image. Furthermore, the slab can be freely rotated and moved in parallel separately from the entire volume.

The invention claimed is:

1. A three-dimensional slab rendering system, comprising:

an input storage unit receiving predetermined characteristics according to positions of the respective parts of a human body having the predetermined characteristics expressed as functions of three-dimensional positions in the form of volume data, and storing the volume data for further processing;

a slab control processor processing spatial distribution of the characteristics to image data on the basis of volume data stored in the input storage unit, displaying the image data, designating a predetermined volume of interest (VOI) displayed on the image data used as a reference image in the form of an arbitrary slab, extracting a three-dimensional image of a designated slab from the volume data, and processing the three-dimensional image, to display a slab rendering image;

a display displaying the reference image and the slab rendering image; and an input unit letting a user designate the VOI from the reference image, a designated image on the basis of the reference image when the slab control command is designated to one selected from the group consisting of the Sagittal image, the Coronal image, and the Axial image being configured to be displayed by the display, the processor being configured to check whether a new rotation center is designated when the slab control command is designated as a request for Rotate on the display, the volume data forming the image displayed on the basis of the new rotation center when the new rotation center is designated being rotated to generate and to display an image, and the volume data forming the image displayed on the basis of the previously set rotation center when the new rotation center is not designated being rotated to generate and to display an image.

2. The slab rendering system of claim 1, wherein the slab control processor comprises a slab control interface that processes the spatial distribution of the characteristics to the image data on the basis of data stored in the input storage unit, displays the image data, designates the predetermined VOI displayed on the image data used as the reference image in the form of an arbitrary slab, and receives the slab, and a processor that obtains coordinate data of the respective boundary surfaces of the slab input to the slab control interface, extracts data corresponding to the inside of the slab in the volume data from the coordinate data, and renders the data.

3. A slab rendering method for receiving volume data, storing the volume data, and displaying a rendering image on the basis of the designated volume data, comprising:

processing spatial distribution to image data according to the manipulation of a user and displaying a reference image;

displaying a screen to input a corresponding command when a user makes a request to display an image for inputting a slab control command; and rendering a three-dimensional slab to render a corresponding slab according to an input of a slab control command effected by the manipulation of a user on a screen displayed when the user makes the request to display the image to input the slab control command, and displaying the three-dimensional slab rendered slab the three-dimensional slab rendering including displaying a designated image on the basis of the reference image when the slab control command is designated to one selected from the group consisting of the Sagittal image, the Coronal image, and the Axial image on the screen displayed when the user makes the request to display the image to input the slab control command, checking whether a new rotation center is designated when the slab control command is designated as a request for Rotate on the screen displayed when the user makes the recluest to display the image to input the slab control command, rotating volume of interest (VOI) planes forming the designated image on the basis of the new rotation center when the new rotation center is designated to generate and to display an image, and rotating the three-dimensional volume data forming the displayed designated image on the basis of the previously set rotation center when the new rotation center is not designated to generate and to display an image.

4. The method of claim 3, wherein rendering the three-dimensional slab further includes moving parallel VOI planes to a normal vector direction to the parallel VOI planes of the designated image displayed according to the manipulation of the user, and displaying the slab when the slab control command is designated to be the request to Move on the screen displayed when the user makes the request to display the image to input the slab control command.

5. The method of claim 3, wherein rendering the three-dimensional slab further includes controlling the thickness of the slab of the designated image displayed according to the manipulation of the user when the slab control command is designated as the request for controlling Thickness on the screen displayed when the user makes the request to display the image to input the slab control command.

6. A computer readable recording medium storing a three-dimensional slab rendering method for receiving volume data, storing the volume data, and displaying a rendering image on the basis of the stored volume data, the method comprising:

processing spatial distribution to image data according to the manipulation of a user, and displaying a reference image;

displaying a screen for inputting a corresponding command when it is requested by a user to display an image for inputting a slab control command; and rendering and displaying a corresponding slab according to an input of a slab control command effected by the manipulation of a user on the screen to input the corresponding command displayed, the three-dimensional slab rendering including displaying a designated image on the basis of the reference image when the slab control command is designated to one selected from the group consisting of the Sagittal image, the Coronal image, and the Axial image on the displayed screen to input the corresponding command, checking whether a new rotation center is designated when the slab control command is designated as a request for Rotate on the displayed screen to input the corresponding command, rotating the three-dimensional volume data forming the designated image displayed on the basis of the new rotation center when the designated new rotation center to generate and to display an image, and rotating volume of interest (VOI) planes forming the displayed designated image on the basis of the previously set rotation center when the new rotation center is not designated to generate and to display an image.

7. The computer readable recording medium of claim 6, wherein rendering and displaying the corresponding slab further includes moving parallel VOI planes to a normal vector direction to the parallel VOI planes of the displayed designated image according to the manipulation of the user, and displaying the slab when the slab control command is designated to be the request for Move on the displayed screen to input the corresponding command.

8. The computer readable recording medium of claim 6, wherein rendering and displaying the corresponding slab further includes controlling the thickness of the slab of the displayed designated image according to the manipulation of the user when the slab control command is designated as the request for controlling Thickness on the displayed screen to input the corresponding command.

* * * * *